(12) United States Patent
Hu (10) Patent No.: US 9,130,465 B2
(45) Date of Patent: Sep. 8, 2015

(54) MINIMUM OFF TIME CONTROL SYSTEMS AND METHODS FOR SWITCHING POWER CONVERTERS IN DISCONTINUOUS CONDUCTION MODE

(71) Applicant: Cree, Inc., Durham, NC (US)

(72) Inventor: Qingcong Hu, Morrisville, NC (US)

(73) Assignee: Cree, Inc., Durham, NC (US)

( * ) Notice: Subject to any disclaimer, the term of this patent is extended or adjusted under 35 U.S.C. 154(b) by 116 days.

(21) Appl. No.: 14/071,733

(22) Filed: Nov. 5, 2013

(65) Prior Publication Data

US 2015/0123565 A1     May 7, 2015

(51) Int. Cl.
*H05B 41/28* (2006.01)
*H02M 3/335* (2006.01)
*H05B 33/08* (2006.01)
*H02M 1/00* (2007.01)

(52) U.S. Cl.
CPC ....... *H02M 3/33507* (2013.01); *H05B 33/0815* (2013.01); *H02M 2001/0058* (2013.01); *H05B 41/28* (2013.01)

(58) Field of Classification Search
USPC ....... 315/247, 224, 225, 185 S, 291, 307–326
See application file for complete search history.

(56) References Cited

U.S. PATENT DOCUMENTS

| 2010/0308733 | A1* | 12/2010 | Shao | 315/119 |
| 2013/0020959 | A1* | 1/2013 | Zhang et al. | 315/224 |

* cited by examiner

*Primary Examiner* — Tuyet Vo
(74) *Attorney, Agent, or Firm* — Jenkins, Wilson, Taylor & Hunt, P.A.

(57) ABSTRACT

Systems and methods are provided for managing switching operation of a power converter, for example and without limitation, for powering LEDs in an efficient manner. According to one aspect, a system for managing a switching operation of a power converter includes an off time control system for managing operation modes of a power converter. The off time control system includes an active device for transmitting a bias signal, where the bias signal is configured for modulating a zero diode current signal for controlling a trigger signal, and a resistive body for discharging the bias signal.

29 Claims, 10 Drawing Sheets

MINIMUM OFF TIME CONTROL SYSTEMS AND METHODS FOR SWITCHING POWER CONVERTERS IN DISCONTINUOUS CONDUCTION MODE

TECHNICAL FIELD

The subject matter disclosed herein relates generally to systems and methods for switching mode power converters. More particularly, the subject matter disclosed herein relates to active managing and/or controlling switching mode of operation in a mode power converter.

BACKGROUND

Power converter systems and/or circuits can be used to drive a variety of loads, such as a light emitting diode (LED). A switching mode power converter can transfer power from a source such as a high voltage power supply, to a load, such as a personal computer, while converting voltage and current characteristics. The switching mode power converter can operate in several modes including a continuous conduction mode, a critical conduction mode, or a discontinuous conduction mode. In a critical conduction mode (also known as the boundary conduction mode), the power converter turns off the power switch at a predetermined time and/or level, and switched on again at a zero-crossing of the current of the power diode. In a discontinuous conduction mode (DCM), the power converter switches on again only after the diode current has gone to zero.

In some applications, operating the power converter in the critical conduction or discontinuous conduction mode can contribute to less dissipation in the switches, providing target characteristics or an improved overall efficiency.

Accordingly, and despite the availability of various power converters and associated components in the marketplace, a need remains for more efficient power converter systems and methods that can be produced quickly and at a lower cost.

SUMMARY

In accordance with this disclosure, off time control systems and related methods for managing operation modes of power converters are provided. According to one aspect, the subject matter described herein can comprise a system for managing one or more switching operation of a power converter that includes an off time control system. The off time control system can include an active device for transmitting a bias signal, where the bias signal can be configured for modulating a zero diode current signal for controlling a trigger signal. The off time control system can also include a resistive body for discharging the bias signal.

According to another aspect, the subject matter described herein can comprise a system for managing one or more switching operation of a power converter. The system can include an off time control system for managing operational modes of a power converter, and the off time control system can include a bipolar junction transistor (BJT) for transmitting a bias signal, where the bias signal is configured for modulating a zero diode signal to generate a trigger signal. The off time control system can also include a resistive body for discharging the bias signal, where the bias signal is directly proportional to the BJT's base voltage $V_b$.

According to another aspect, the subject matter described herein can comprise a method for using a trigger signal for managing one or more switching operation of a power converter. The method can include a control circuit for managing operation modes of a power converter, receiving a zero diode current signal, modulating the zero diode current signal with a bias signal to control a trigger signal, and directing the generated trigger signal to a control unit.

These and other objects of the present disclosure as can become apparent from the disclosure herein are achieved, at least in whole or in part, by the subject matter disclosed herein.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures, in which.

DETAILED DESCRIPTION

The subject matter disclosed herein is directed to systems and methods for managing one or more switching operation of a power converter. More particularly, the subject matter disclosed herein relates to using a trigger signal for managing one or more switching operation of a power converter in the CRM (critical conduction mode) and DCM (discontinuous conduction mode). It should be noted that although the subject matter can be used to drive an LED load as described for example herein, it can also be used with other non-LED systems.

In some aspects, an LED load can be biased by driver circuits such as a power converter. The power converter can include an off time control circuit electrically coupled to a controller IC, and the IC can be configured to generate trigger signals back to the power converter. For example, an L656X series controller IC can generate a gate drive signal GD to trigger the power converter to turn on the power switch. The gate drive signal GD can also be electrically coupled to the off time control system to function as a biasing voltage. In some aspects, the off time control circuit can be electrically coupled to a zero diode current signal (switch voltage) VSW, which is a signal indicating zero current on a diode within the driver. Furthermore, the off time control circuit can be configured to generate a trigger signal ZCD designed to trigger the gate drive signal GD through the controller IC. For example, the trigger signal ZCD can be electrically coupled to the L656X control IC. When the gate drive signal GD has been turned off by the L656X control IC, ZCD can start a gradual decay in value until it reaches a threshold value, at which point the control IC can be triggered to switch on the gate drive signal GD.

This arrangement can ensure that the LED driver operates within either the critical conduction mode (CRM) or the discontinuous conduction mode (DCM), which can have the advantages such as high power factors, low harmonics distortions, no hard switchings on the diode, and/or easy EMI filtering etc.

Reference will be made in detail to possible aspects or embodiments of the subject matter herein, one or more examples of which are shown in the figures. Each example is provided to explain the subject matter and not as a limitation. In fact, features illustrated or described as part of one embodiment can be used in another embodiment to yield still a further embodiment. It is intended that the subject matter disclosed and envisioned herein covers such modifications and variations.

As used herein, the term of a voltage value being "high" refers to the voltage being turned on, and the term of a voltage value being "low" refers to the voltage being turned off.

As used herein, the term "clamp" or "clamping" a voltage refers to keeping that voltage above a particular voltage level.

Unless the absence of one or more elements is specifically recited, the terms "comprising", including", and "having" as used herein should be interpreted as open-ended terms that do not preclude the presence of one or more elements.

Figure 1A:
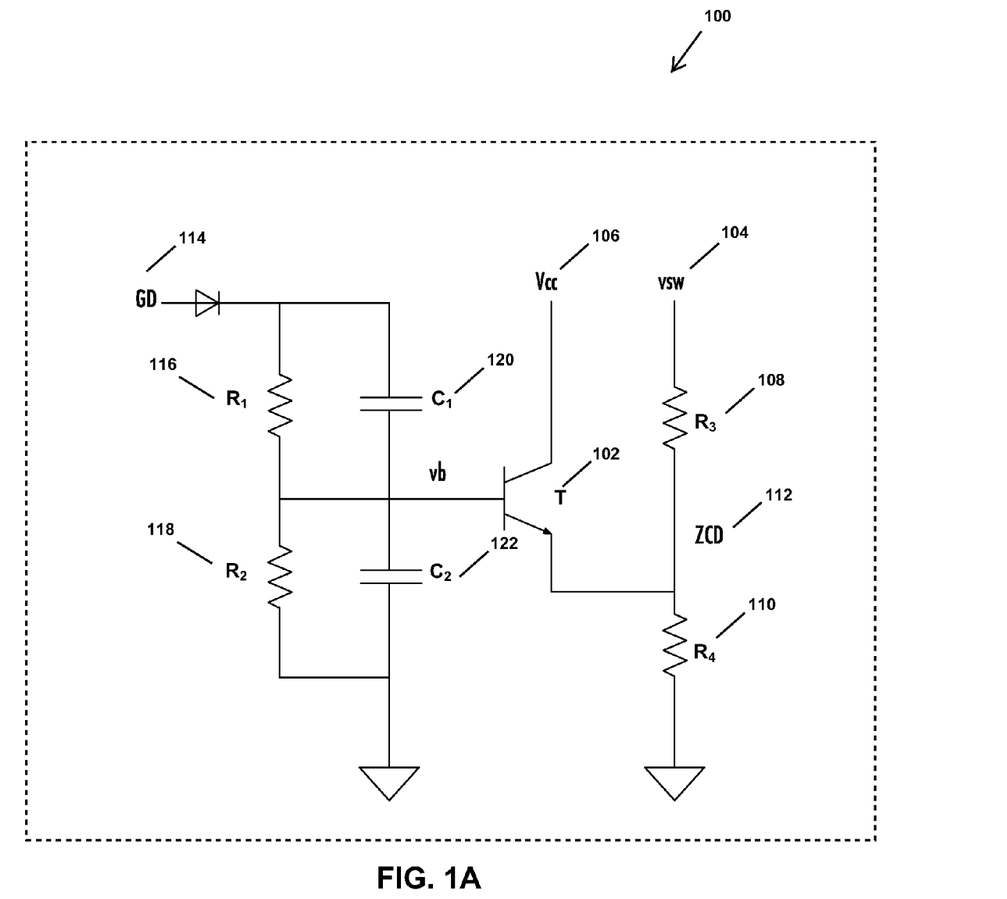
FIG. 1A is a schematic illustration of an exemplary embodiment of an off time control system for powering a load comprised of light emitter diodes (LEDs) according to the disclosure herein.

FIG. 1A of the drawings illustrates an off time control system for powering a load comprising of light emitting diodes (LEDs), generally designated 100. The off time control system 100 includes a transistor T 102 electrically connected to a switch voltage VSW 104, which also is the signal indicating zero current on the power converter's power diode. The transistor T 102 can be a NPN type bipolar junction transistor (BJT) biased by a DC voltage $V_{cc}$ 106 at the transistor's 102 collector node.

In some aspects, the switch voltage (or the zero diode current signal) VSW 104 can be electrically coupled to the transistor T's 102 emitter node through a voltage divider. The voltage divider can include two resistors $R_3$ 108 and $R_4$ 110, and a trigger voltage ZCD 112 can be determined and controlled by a combination of the zero diode current signal (switch voltage) VSW 104 across the voltage divider and the emitter voltage from transistor T 102. The trigger voltage ZCD 112 can be directed to a control IC to switch on the LED driver. As used herein, the terms "switch on" or "switching on" an LED driver refers to turning on a switch within the power converter. For example, the control IC can be a L656X series IC designed to regulate electrical power supplied to the LED. In some aspects, the trigger voltage ZCD 112 can be electrically coupled to the L656X control IC. When the trigger voltage ZCD 112 drops below a threshold value, the control IC can generate a gate drive signal GD 114 to switch on the LED driver, or the power converter.

In some aspects, the gate drive signal GD 114 can be electrically coupled to the transistor T 102. For example, the gate driver signal GD 114 can be connected to the transistor T's 102 base node through a resistor combination $R_1$ 116 and $R_2$ 118. As such, when GD 114 is generated and directed to the transistor T 102, the transistor T's 102 base voltage $V_b$ can become a turn on voltage $V_{bo}$, which can be determined by a combination of the gate drive signal GD 114 and $R_1$ 116 and $R_2$'s 118 resistance values, for example:

$$Vbo = GD\left(\frac{R2}{R1 + R2}\right)$$

Furthermore, because the trigger voltage ZCD 112 is electrically coupled to the emitter node of transistor T 102, when $V_b$ is high (e.g. $V_b=V_{bo}$), ZCD's 112 voltage value is at least as high as $V_{bo}$, subtracting the voltage drop across the base-emitter junction (e.g. $V_{be}$), which is approximately 0.7 volts for a silicon based transistor. In addition, when the gate drive signal GD 114 is on, capacitors $C_1$ 120 and $C_2$ 122 can be simultaneous charged because they are electrically coupled to the gate drive signal.

In some aspects, the gate drive signal GD 114 can be turned off by the control IC (e.g. L656X series IC) after a pre-determined duration of time, at which time the power switch of the LED driver is also turned off. Accordingly, transistor T's 102 base voltage will decay gradually over a certain duration of time $T_{decay}$. For example, after the gate drive signal GD 114 has been turned off, resistor $R_2$ 118 can gradually discharge capacitor $C_2$ 122, which lowers the base voltage value $V_b$ over time. Because the trigger voltage ZCD 112 is clamped high by the transistor base voltage $V_b$, when $V_b$ decays to a lower value, ZCD 112 will also decay gradually over time. The trigger voltage ZCD 112 can be electrically coupled to the control IC (e.g. L656X series IC), and when ZCD 112 reaches a threshold value $V_{trig}$ the control IC can switch on the gate drive signal GD 114 again. ZCD 112 can reach the threshold voltage value $V_{trig}$ only when transistor base voltage $V_b$ drops below a voltage value of $V_{trig} V_{be}$, $V_{be}$ being the voltage drop across the transistor base and emitter. Therefore the decay time $T_{decay}$ is also the time it takes for the base voltage $V_b$ to decay from $V_{bo}$ to $V_{trig}+V_{be}$. Once the gate drive signal GD 114 has been switched on, the base voltage $V_b$ can be increased back to the $V_{bo}$ level relatively quickly with the charge built up from capacitor $C_1$ 120.

In some aspects, the power diode current can reach zero before the trigger voltage ZCD 112 decays to the $V_{trig}$ level. Therefore, the LED driver does not turn on the switch until the gate drive signal GD 114 becomes high again, which is some time after the diode current becomes zero. As such, the LED driver is operating in a discontinuous conduction mode (DCM), which prevents the switch and the diode from performing hard switchings and can lead to less energy waste and other benefits in some applications.

In some other aspects, $V_b$ can be at a voltage level that is below the $V_{trig}+V_{be}$ level before the diode current reaches zero. As such, the trigger voltage ZCD 112 becomes predominately determined by the zero diode current signal (switch voltage) VSW 104. For example, the value of ZCD 112 can be determined by a combination of VSW 104 and $R_3$ 108 and $R_4$'s 110 resistance values:

$$ZCD = VSW\left(\frac{R4}{R3 + R4}\right)$$

When the current of the power diode becomes zero, zero diode current signal (switch voltage) VSW also drops to a lower value, which can drive the trigger voltage ZCD 112 to reach the threshold voltage $V_{trig}$. The trigger voltage ZCD 112 can then signal the control IC to set the gate drive signal GD 114 to high and turn on the switch of the converter. Therefore, the base voltage $V_b$ decay time $T_{decay}$ in this case is shorter than the time for the diode current to reach zero after the power converter's switch is turned off. Furthermore, the gate drive signal GD 114 becomes high approximately right after the power diode current reaches zero, barring some delay such as circuit reaction time, which turns on the power switch of the power converter, also the LED driver. As such, the power converter is said to be operating in a critical conduction mode (CRM).

In some aspects, the off time control system 100 can keep the power converter to be operating in either the discontinuous conduction mode (DCM) or the critical conduction mode (CRM), since the power converter would only switch on either right after, or some times after the power diode current has reached zero. This can prevent the power converter from performing hard switchings while the power diode is still on, which can improve device durability and improve power efficiency. Furthermore, the circuit set up as illustrated in FIG. 1A can allow a system designer the convenience of obtaining an optimal off time by introduce simple and easy variations to the circuit. For example, a particular off time may be required for specific power factor, low harmonic distortions, device efficiency and/or manufacturing costs, and such off time can be easily achieved by adjusting the resistance and/or capacitance values of the passive components within the circuitry. Various circuitry components shown within the dashed lines of off time control system 100 can be substituted or replaced, such as for example by circuitry components shown in any other circuits herein.

Figure 1B:
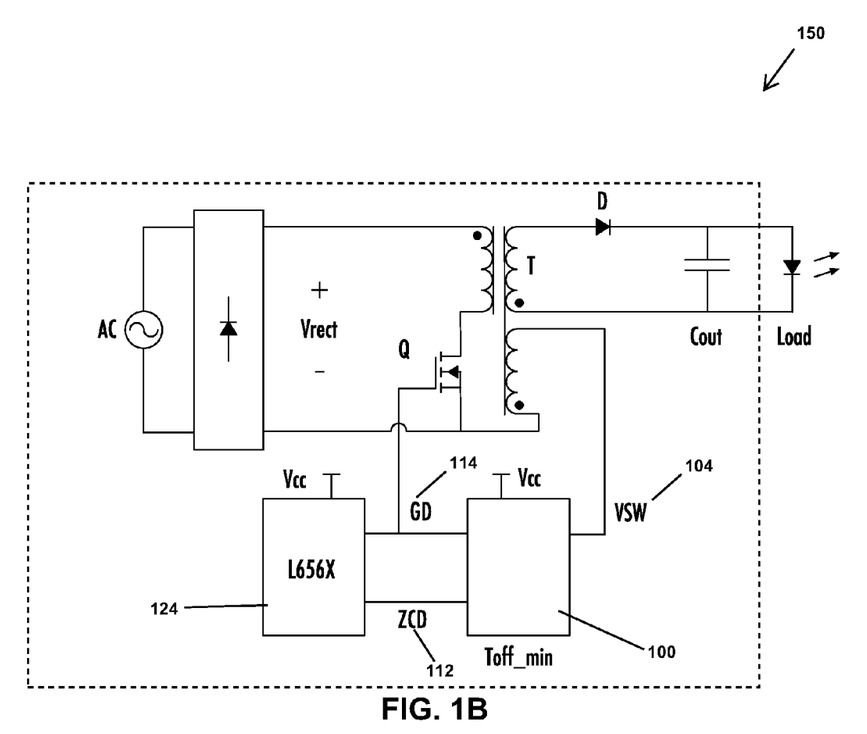
FIG. 1B is a schematic illustration of an exemplary embodiment of a power converter driver circuit according to the disclosure herein.

FIG. 1B shows a power converter driver circuit, generally designated 150, driving a load. A load such as an LED can be biased by driver circuits such as a buck-boost converter, a flyback converter, a single-ended primary-inductor converter (SEPIC), or converters of similar nature. Shown in FIG. 1B is a flyback type converter powering a load, although other driver circuits (e.g. buck-boost, SEPIC etc) can be utilized for the same purpose, which is converting an AC power source to a DC output, as the example provided herein is to explain an example of the subject matter and is not intended as a limitation. In some aspects, the driver circuit 150 can include an off time control system 100 designed to communicate with a controller IC 124 configured to generate the gate drive signal GD 114 to the driver circuit 100. For example, the controller IC 124 can be a L656X series IC, and the gate drive signal GD 114 can trigger the driver circuit 150 to provide power to the load. The gate drive signal GD 114 can also be electrically coupled to the off time control system 100 to function as a biasing voltage. In some aspects, the off time control system 100 can be electrically coupled to a switch voltage VSW 104, which can be an indicating signal of when the diode current becomes zero. Furthermore, the off time control system 100 can be configured to generate a trigger voltage ZCD 112 designed to trigger the gate drive signal GD 114. For example, the trigger voltage ZCD 112 can be electrically coupled to the L656X control IC 124. When the gate drive signal GD 114 has been turned off by the L656X control IC 124, ZCD 112 can start a gradual decay in value until it reaches a threshold value $V_{trig}$, at which point the control IC 124 can be triggered to switch on the gate drive signal GD 114 again. Once switched on, the gate drive signal GD 114 can drive the trigger voltage ZCD 112 back to a turn on voltage level (e.g. $V_{bo}$) until GD 114 is turned off again, at which time ZCD 112 will start the gradual decay again.

As shown in FIG. 1A, the off time control system 100 can trigger the control IC 124 to turn on the switch in the power converter either right after the power diode current has reached zero, or not too long after, therefore ensuring that the power converter operates within either the critical conduction mode (CRM), or a not very deep discontinuous conduction mode (DCM). Operating in the critical conduction mode and/or the discontinuous conduction mode can contribute to operational benefits such as, for example, high power factors, low harmonic distortions, no hard switchings on the diode, and/or easy EMI filtering etc. Various circuitry components shown within the dashed lines of power converter driver circuit 150 can be substituted or replaced, such as for example by circuitry components shown in any other circuits herein.

Figure 1C:
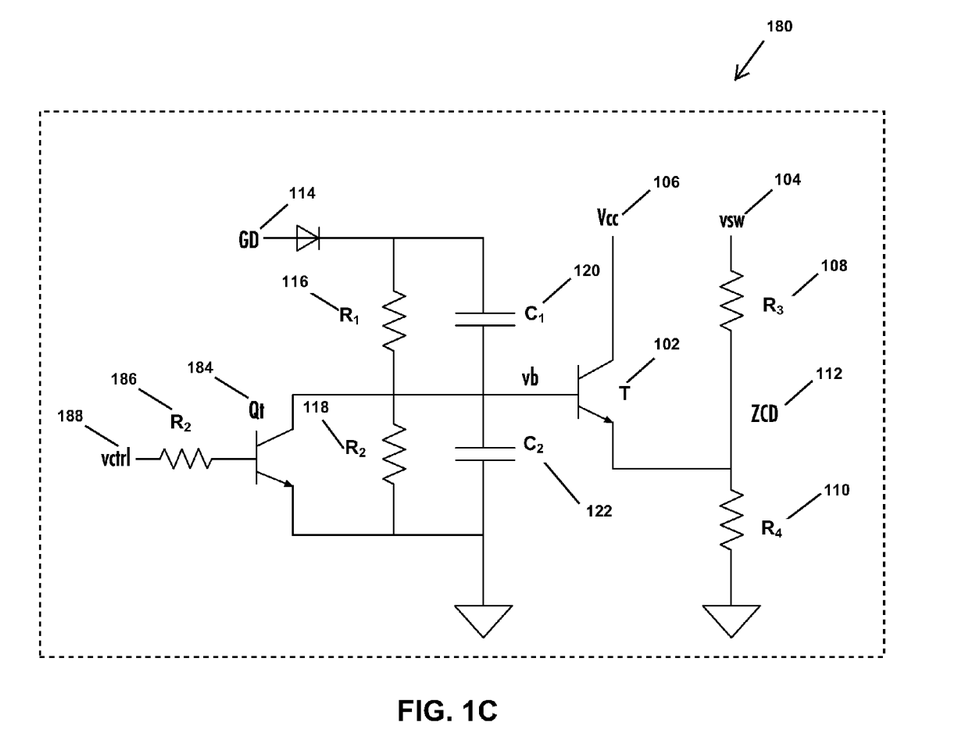
FIG. 1C is a schematic illustration of another exemplary embodiment of an off time control system for powering a load comprised of light emitter diodes (LEDs) according to the disclosure herein.

FIG. 1C of the drawings illustrates another embodiment of the off time control system, generally designated 180, according to the disclosure herein. Compared to the off time control system shown in FIG. 1A, FIG. 1C illustrates a system where the decay of the base voltage $V_b$ can be actively controlled. For example, another transistor $Q_t$ 184 can be electrically coupled across the resistor $R_2$ 118 to control the rate of decay across the resistor. In addition, a control voltage $V_{ctrl}$ 188 can be electrically coupled to the transistor $Q_t$ 184 through a resistor $R_5$ 186 to provide dynamic and/or active control to the decay time $T_{decay}$. In some aspects, the control voltage $V_{ctrl}$ 188 can be an input voltage to the driver circuit or other signal voltages. Various circuitry components shown within the dashed lines of off time control system 180 can be substituted or replaced, such as for example by circuitry components shown in any other circuits herein.

Figure 1D:
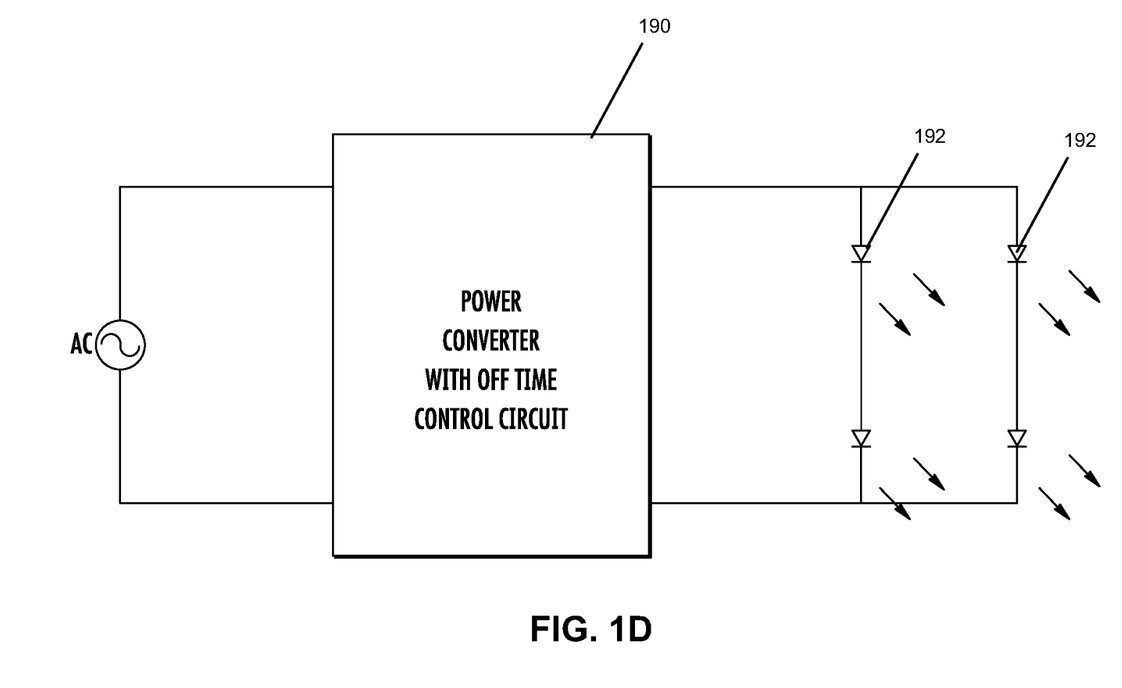
FIGS. 1D to 1F are schematic illustrations of a power converter with the off time control system powering light emitting diodes (LED) according to the disclosure herein.

FIG. 1D of the drawing illustrates a power converter with the off time control system powering multiple strings of LEDs. As shown in FIG. 1D, the power converter with the off time control circuit 190 can power two strings of LEDs 192 placed in parallel as the load. It should be noted that a single string of LEDs or multiple strings (more than two) of LEDs can be conveniently connected in a similar configuration.

Figure 1E:
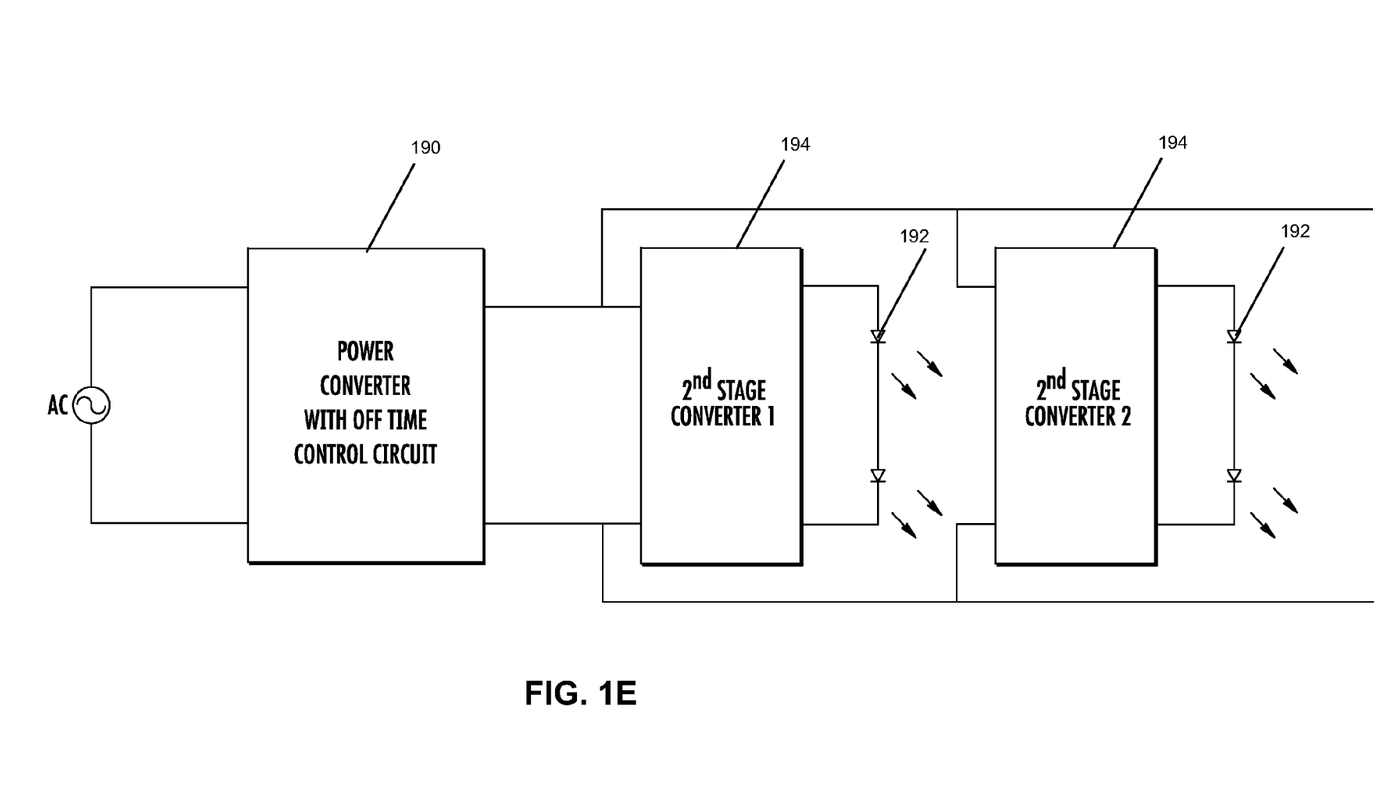

Furthermore, the power converter with the off time control circuit 190 can be configured to generate multiple different power outputs. As shown in FIG. 1E, the power converter 190 can be connected to at least one power system, such as a second stage converter, to generate different outputs for various LEDs strings. For example, different color LEDs can require different biasing powers. A second stage converter 194 can be connected to the power converter with the off time control circuit 190 to further modulate its output power to satisfy various power requirements.

Figure 1F:
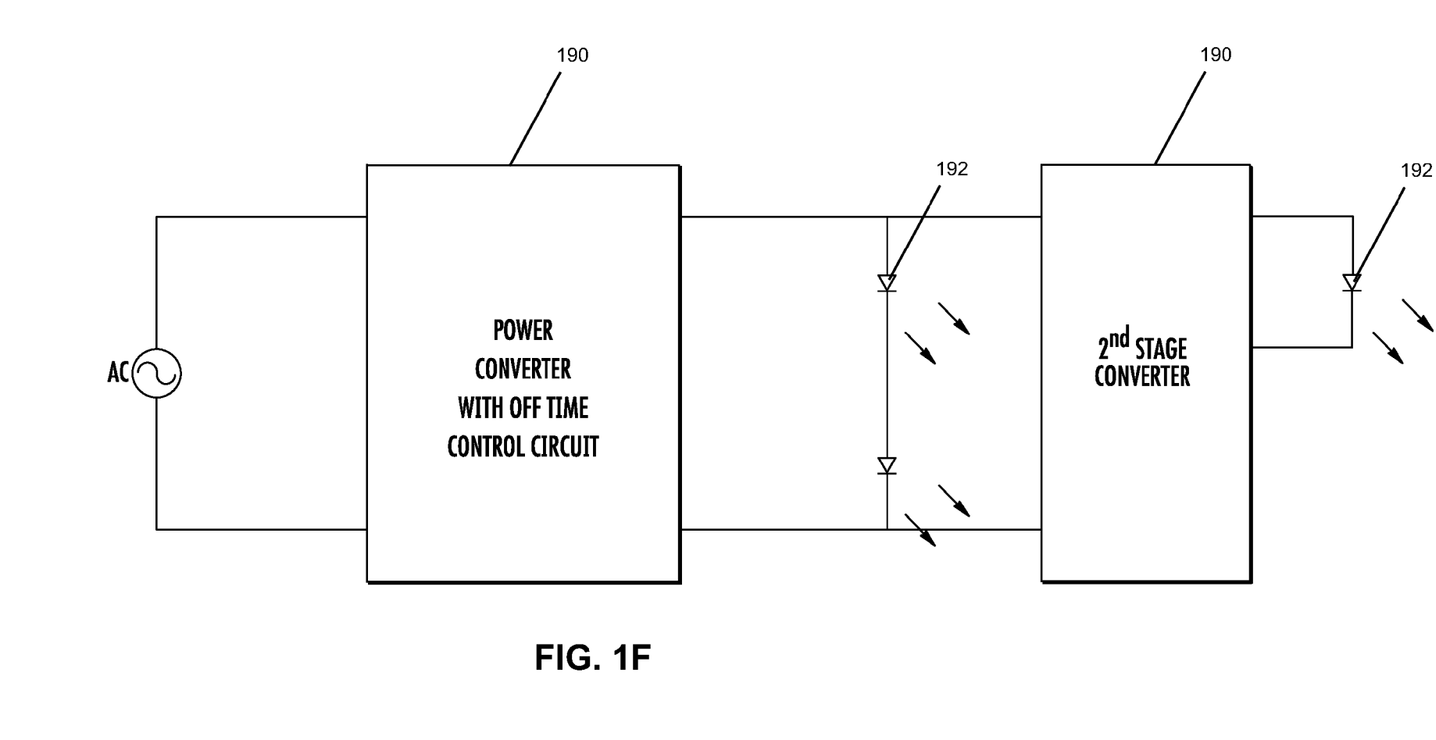

FIG. 1F of the drawing illustrates another exemplary embodiment of the power converter with the off time control circuit providing multiple different power outputs. As shown in FIG. 1F, a second stage converter 194 can be connected in parallel to a string of LEDs 192 and modulating the output power from the power converter 190 to power another LED 192.

Figure 2A:
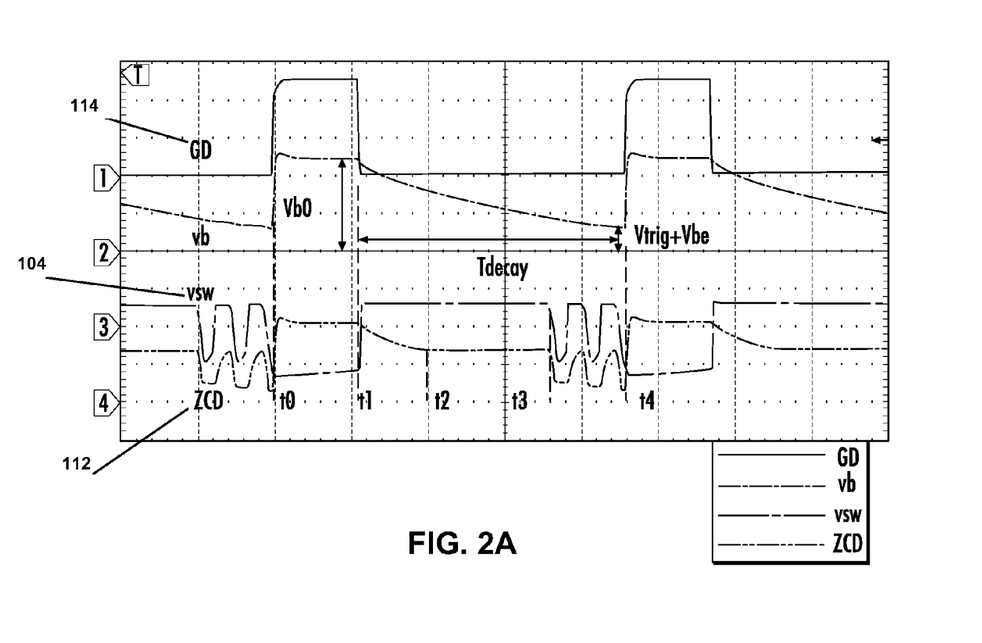
FIGS. 2A to 2B are waveform diagrams of various signals of the off time control system according to the disclosure herein.

FIG. 2A shows a waveform diagram of various signals of the off time control system when the power converter is operating in a discontinuous conduction mode (DCM). As shown in FIG. 2A, at time $t_0$, a control IC 124 such as a L656X series IC can switch on the gate drive signal GD 114, which also increases the transistor T's 102 base voltage $V_b$ to a voltage level $V_{bo}$, because $V_b$ is biased by the gate drive signal GD 114. When the base voltage Vb is switched on at time $t_0$, the trigger voltage ZCD 112 becomes high as well, because ZCD 112 is electrically coupled to transistor T 102 and therefore clamped by the base voltage $V_b$. At time $t_1$, the control IC 124 turns off the power switch and the gate drive signal GD 114 is switched off, after which $V_b$ will go through a gradual decay as capacitor $C_2$ 122 is being discharged by resistor $R_2$ 118. Since the trigger voltage ZCD 112 is clamped by the base voltage, ZCD 112 similarly will also go through a gradual decay starting at time $t_1$. Furthermore, the diode starts conducting at time $t_1$ and the zero diode current signal (switch voltage) VSW 104 becomes high. Because the power switch of the power converter gets turned off at time the power diode will be conductive only through time periods $t_1$ to $t_3$, and at $t_3$ the diode current goes to zero, at which time the zero diode current signal (switch voltage) VSW 104 will start to fluctuate and cause a ripple in the signal output. Likewise the trigger voltage ZCD 112 will also start to fluctuate at time $t_3$ because ZCD 112 is biased by the zero diode current signal (switch voltage) VSW 104 through a voltage divider. However, ZCD 112 will continue to decay until it reaches a threshold voltage level $V_{trig}$, and ZCD 112 can reach the threshold ($V_{trig}$) level only when the transistor T's 102 base voltage $V_b$ decays to a value of $V_{trig} V_{be}$, $V_{be}$ being the voltage drop across the transistor's base and emitter. It can take a period of time Tdecay for the base voltage to decay from $V_{bo}$ to $V_{trig}+V_{be}$, at which time the trigger voltage ZCD 112 can be at the threshold voltage level $V_{trig}$ and triggers the control IC 124 to switch on the gate drive signal GD 114 again at time $t_4$. As the cycle ($t_0$ through $t_4$) repeats itself, the power converter is operating in a discontinuous conduction mode (DCM) because the diode's current reaches zero before the trigger voltage ZCD 112 decays to the $V_{trig}$ level. Therefore, the power converter does not turn on the switch until the gate drive signal GD 114 becomes high again, which is some time after the diode current becomes zero, which prevents the diode from performing hard switchings, and can lead to higher power factors and less energy waste.

Figure 2B:
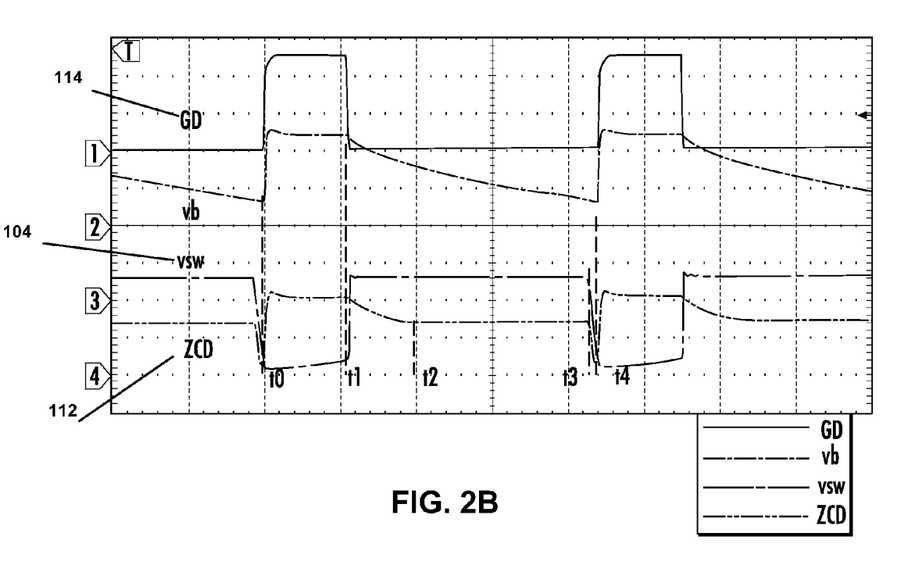

FIG. 2B shows a waveform diagram of various signals of the off time control system when the power converter is operating in a critical conduction mode (DCM). As shown in FIG. 2B, at time $t_0$, a control IC 124 such as a L656X series IC can switch on the gate drive signal GD 114, which also increases the transistor T's 102 base voltage $V_b$ to a voltage level $V_{bo}$, because $V_b$ is biased by the gate drive signal GD 114. When the base voltage $V_b$ is switched on at time $t_0$, the trigger voltage ZCD 112 becomes high as well, because ZCD 112 is electrically coupled to transistor T 102 and therefore clamped by the base voltage $V_b$. At time the control IC 124 turns off the power switch and the gate drive signal GD 114 is switched off. After which $V_b$ will go through a gradual decay as capacitor $C_2$ 122 is being discharged by resistor $R_2$ 118. Since the trigger voltage ZCD 112 is clamped by the base voltage, ZCD 112 similarly will also go through a gradual decay starting at time $t_1$. Furthermore, the diode starts conducting at time $t_1$ and the zero diode current signal (switch voltage) VSW 104 becomes high. After the power switch of the power converter gets turned off at time the diode will be conductive only through time periods $t_1$ to $t_3$, and at $t_3$ the power diode current goes to zero, at which time the zero diode current signal (switch voltage) VSW 104 will start fluctuate and cause a ripple in the signal output. Likewise the trigger voltage ZCD 112 will also start to fluctuate at time $t_3$ because ZCD 112 is biased by the zero diode current signal (switch voltage) VSW 104 through a voltage divider. However, in this case the base voltage $V_b$ can decay to the level of $V_{bo}$ $V_{be}$ before the diode current goes to zero. This can be achieved, for example, by setting the peak voltage Vbo to a lower level. As such, the trigger voltage ZCD 112 can drop to the threshold voltage $V_{trigg}$ once the diode current reaches zero, since ZCD 112 here is no longer clamped by the base voltage $V_b$. The trigger voltage ZCD 112 will then trigger the control IC 124 to switch on the gate drive signal GD 114 again. Therefore, the base voltage $V_b$ decay time $T_{decay}$ in this case is shorter than the time for the diode current to reach zero when the diode power is turned off. Furthermore, the gate drive signal GD 114 gets switched on approximately right after the diode current reaches zero, barring some delay such as circuit reaction time, which turns on the power switch of the power converter. As the cycle ($t_0$ through $t_4$) repeats itself, the light emitting diode (LED) is operating in a critical conduction mode (CRM) since the power converter turns on the power switch almost right after the diode current goes to zero, which can prevent the ripples caused by the fluctuating zero diode current signal (switch voltage) VSW 104 and simplifying signal filtering later on.

Figure 3A:
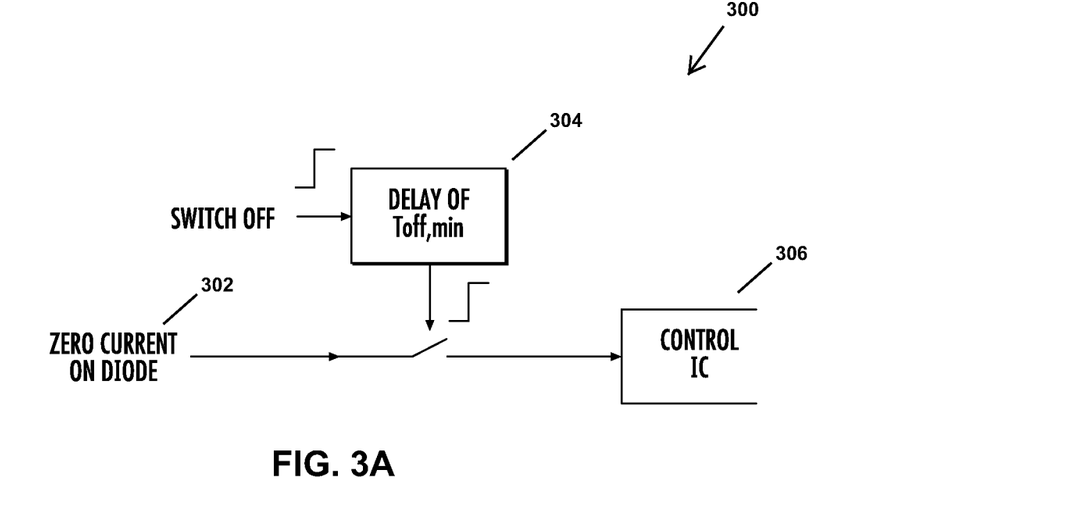
FIGS. 3A and 3B are block diagrams depicting exemplary embodiments of the off time control system working with a control IC according to the disclosure herein.

FIG. 3A is a block diagram depicting an off time control system 300 working with a control IC. As shown in FIG. 3A, the signal of zero current 302 on the power diode can trigger a next switching on of the power converter, but it can only be passed to the control IC 306 after a time of $T_{off,min}$ 304 after the power switch of the power converter has been turned off. Therefore, the switch off time on the power converter cannot be less than the duration of the time $T_{off,min}$ 304. As such, $T_{off,min}$ 304 is the minimum off time of the power converter.

Figure 3B:
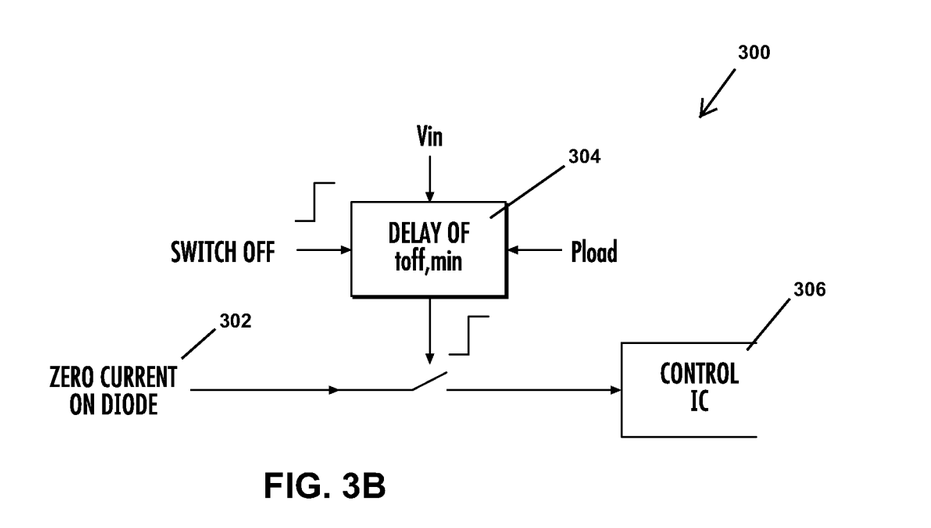

FIG. 3B is another block diagram illustrating the off time control system 300 working with a control IC. In addition to the illustration in FIG. 3A, the time $T_{off,min}$ 304 can be dynamically adjusted to optimize the LED driver circuit performance. For example, additional inputs such as input voltage and/or load variations can be utilized to actively adjust the time $T_{off,min}$ 304 to achieve a wide operation range on the driver circuit.

Figure 4:
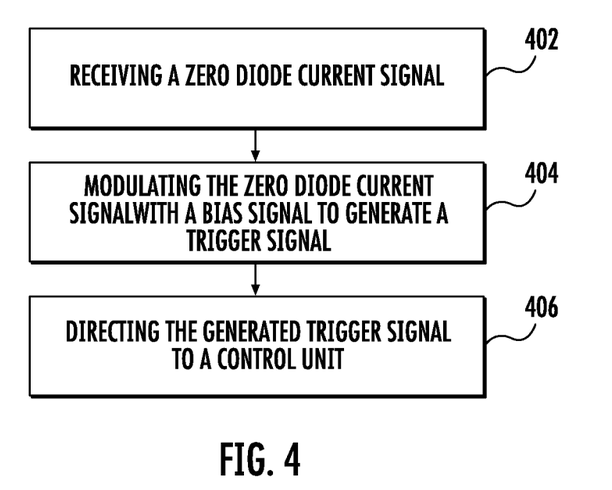
FIG. 4 is a flow chart illustrating an exemplary method for using a trigger signal for managing light emitting diode power switching according to the disclosure herein.

FIG. 4 is a flow chart illustrating an exemplary method for using a trigger signal for managing switching operation of a power converter. As shown in FIG. 4, at step 402 a zero diode current signal (switch voltage) VSW can be received by the off time control system through a voltage divider. The off time control system can include an active device such as a bipolar junction transistor (BJT), and the zero diode current signal VSW can be electrically coupled to the BJT's emitter node.

At step 404, the zero diode current signal VSW can be modulated with a bias signal to generate a trigger signal. For example, a gate drive signal GD can be coupled to the off time control system by a controller IC. The gate drive signal GD can be directed to the BJT's base node to function as a biasing voltage to the transistor's base voltage $V_b$. Since the transistor's emitter voltage $V_e$ follows its base voltage, and the zero diode current signal VSW is electrically coupled to the emitter node, the zero diode current signal VSW can be in fact modulated by the transistor's base voltage $V_b$, therefore also modulated by the gate drive signal GD. Furthermore, the combination of the transistor's emitter voltage $V_e$ (following $V_b$ with a constant voltage difference) and the zero diode current signal VSW can be used as a trigger signal ZCD to the controller IC. For example, ZCD can be modulated by the emitter voltage $V_e$ when the transistor base voltage $V_b$ is switched on. When $V_b$ is high (switched on), ZCD will be clamped by $V_b$ and therefore stay high. When $V_b$ becomes low (switched off), ZCD can be predominately modulated by VSW, and when diode current goes to zero, ZCD can reach a threshold voltage value $V_{trig}$.

As illustrated in step 406, the trigger signal ZCD can be electrically coupled to the controller IC, and when ZCD reaches the threshold level $V_{trig}$, the controller IC can be triggered to generate the gate drive signal GD to switch on a power switch of the power converter.

While the devices and methods have been described herein in reference to specific aspects, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein. Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

What is claimed is:

1. A system for managing a switching operation of a power converter, the system comprising:
an off time control system for managing operation modes of a power converter, wherein the off time control system comprises:
an active device for transmitting a bias signal to modulate a zero diode current signal for controlling a trigger signal; and
a resistive body for discharging the bias signal.

2. The system of claim 1, configured for transmitting the trigger signal to a control unit configured to switch on a switch of the power converter.

3. The system of claim 1, wherein the power converter is configured to power at least one light emitting diode (LED).

4. The system of claim 1, wherein the power converter is electrically coupled to at least one power system to generate at least one output for powering at least one light emitting diode (LED).

5. The system of claim 1 wherein the active device comprises a bipolar junction transistor (BJT).

6. The system of claim 5 wherein the bias signal is directly proportional to a base voltage $V_b$ of the BJT.

7. The system of claim 5 further comprising a capacitor configured to store charges when the base voltage $V_b$ of the BJT is switched on.

8. The system of claim 7 wherein the capacitor is connected in parallel to the resistive body.

9. The system of claim 1 further comprising a gate drive signal electrically coupled to the off time control system and configured to modulate the bias signal.

10. The system of claim 9 further comprising a voltage divider connecting the gate driver signal and the bias signal.

11. The system of claim 1 further comprising a control signal electrically coupled to the resistive body to dynamically control the bias signal discharge over the resistive body.

12. The system of claim 11 further comprising an active device electrically coupled to the control signal and the resistive body and configured to dynamically control bias signal discharge over the resistive body.

13. A system for managing a switching operation of a power converter, the system comprising:
an off time control system for managing operation modes of a power converter, wherein the off time control system comprises:
a bipolar junction transistor (BJT) for transmitting a bias signal to modulate a zero diode current signal to generate a trigger signal;
a biasing voltage $V_{cc}$ electrically coupled to the BJT's collector node; and
a resistive body for discharging the bias signal;
wherein the bias signal is directly proportional to abase voltage $V_b$ of the BJT.

14. The system of claim 13 configured for transmitting the trigger signal to a control unit configured to switch on a switch of the power converter.

15. The system of claim 13, wherein the power converter is configured to power at least one light emitting diode (LED).

16. The system of claim 13, wherein the power converter is electrically coupled to at least one power system to generate at least one output for powering at least one light emitting diode (LED).

17. The system of claim 13 further comprising a capacitor configured to store charges when the base voltage $V_b$ of the BJT is switched on.

18. The system of claim 17 wherein the capacitor is connected in parallel to the resistive body.

19. The system of claim 13 further comprising a gate drive signal electrically coupled to the off time control system and configured to modulate the bias signal.

20. The system of claim 19 further comprising a voltage divider connecting the gate driver signal and the bias signal.

21. The system of claim 13 further comprising a control signal electrically coupled to the resistive body to dynamically control the bias signal discharge over the resistive body.

22. The system of claim 21 further comprising an active device electrically coupled to the control signal and the resistive body and configured to dynamically control bias signal discharge over the resistive body.

23. A method for using a trigger signal for managing a switching operation of a power converter, the method comprising:
at a control circuit for managing operational modes of a power converter:
receiving a zero diode current signal;
modulating the zero diode current signal with a bias signal to control a trigger signal; and
directing the trigger signal to a control unit.

24. The method of claim 23 wherein receiving the zero diode current signal comprises receiving the signal through a voltage divider.

25. The method of claim 23 wherein controlling the trigger signal comprises clamping the trigger signal with the bias signal through an active device.

26. The method of claim 25 wherein clamping the trigger signal with the bias signal comprises modulating the bias signal with a switch control signal through a voltage divider.

27. The method of claim 26 wherein modulating the bias signal comprises discharging the bias signal through a resistor electrically coupled to the switch control signal.

28. A system for managing a switching operation of a power converter, the system comprising:
an off time control system for managing an operation mode of a power converter, wherein the off time control system comprises:
an active device for transmitting a bias signal to modulate a zero diode current signal for controlling a trigger signal, wherein the trigger signal is configured to activate a switch to provide power to a light emitting diode (LED) load; and
a resistive body for discharging the bias signal.

29. A method for using a trigger signal for managing a switching operation of a power converter, the method comprising:
at a control circuit for managing operational modes of a power converter:
receiving a zero diode current signal;
modulating the zero diode current signal with a bias signal to control a trigger signal, wherein the trigger signal is configured to activate a switch to provide power to a light emitting diode (LED) load; and
directing the trigger signal to a control unit.

* * * * *